US007677586B2

(12) United States Patent
Bloom

(10) Patent No.: US 7,677,586 B2
(45) Date of Patent: Mar. 16, 2010

(54) WHEELCHAIR DRIVE ASSEMBLY

(76) Inventor: Lawrence E. Bloom, 9842 E. San Salvador Dr., Scottsdale, AZ (US) 85258

( * ) Notice: Subject to any disclaimer, the term of this patent is extended or adjusted under 35 U.S.C. 154(b) by 269 days.

(21) Appl. No.: 11/694,469

(22) Filed: Mar. 30, 2007

(65) Prior Publication Data

US 2008/0238023 A1 Oct. 2, 2008

(51) Int. Cl.
*B62M 1/14* (2006.01)

(52) U.S. Cl. .................................................. 280/250.1

(58) Field of Classification Search ............. 280/250.1; 24/457, 525, 569; 403/DIG. 7, 344, 332, 403/316, 309, 241, 234, 233, 208, 204
See application file for complete search history.

(56) References Cited

U.S. PATENT DOCUMENTS

| | | | | |
|---|---|---|---|---|
| 2,876,486 | A * | 3/1959 | Lindstrom | 16/421 |
| 4,045,047 | A * | 8/1977 | Buckley | 280/250.1 |
| 4,358,126 | A * | 11/1982 | Mitchell et al. | 280/250.1 |
| 4,453,729 | A | 6/1984 | Lucken | |
| 4,503,724 | A | 3/1985 | Ward | |
| 4,506,900 | A | 3/1985 | Korosue | |
| 4,560,181 | A | 12/1985 | Herron | |
| 4,682,784 | A | 7/1987 | Anderson | |
| 4,993,732 | A * | 2/1991 | Wedemeyer | 280/250.1 |
| 5,007,655 | A | 4/1991 | Hanna | |
| 5,020,818 | A * | 6/1991 | Oxford | 280/250.1 |
| D330,177 | S * | 10/1992 | Shetter | D12/131 |
| 5,228,709 | A | 7/1993 | Kao | |
| 5,303,945 | A | 4/1994 | Oxford | |
| 5,577,748 | A | 11/1996 | Dombrowski et al. | |
| 5,743,544 | A | 4/1998 | Weaver | |
| 6,247,715 | B1 | 6/2001 | Korosue | |
| 6,634,663 | B2 * | 10/2003 | Mitchell | 280/250.1 |
| 6,755,430 | B1 * | 6/2004 | Watwood et al. | 280/250.1 |
| 7,261,309 | B2 * | 8/2007 | Watwood et al. | 280/244 |
| 7,272,996 | B2 * | 9/2007 | Pontieri | 81/176.15 |
| 2008/0252036 | A1 * | 10/2008 | Smurthwaite | 280/250.1 |

* cited by examiner

*Primary Examiner*—Lesley Morris
*Assistant Examiner*—Daniel Yeagley
(74) *Attorney, Agent, or Firm*—Parsons & Goltry; Michael W. Goltry; Robert A. Parsons

(57) ABSTRACT

A wheelchair includes a seat carried by a frame including at least one front wheel and opposed rear wheels. A circular handrim is coupled to one of the rear wheels with spaced-apart connecting pins. A framework is secured to the handrim, and a ratchet operatively couples an inner end of a lever to the framework. The lever extends upwardly from the ratchet to the outer end allowing a user seated in the seat of the wheelchair to grasp the outer end of the lever and move the lever between a first position and a second position. The ratchet acts on the framework to impart rotation to the one of the rear wheels in response to movement of the lever between the first and second positions.

20 Claims, 7 Drawing Sheets

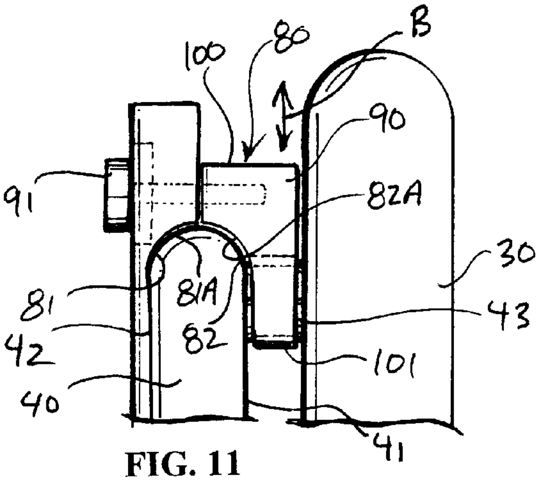
FIG. 11
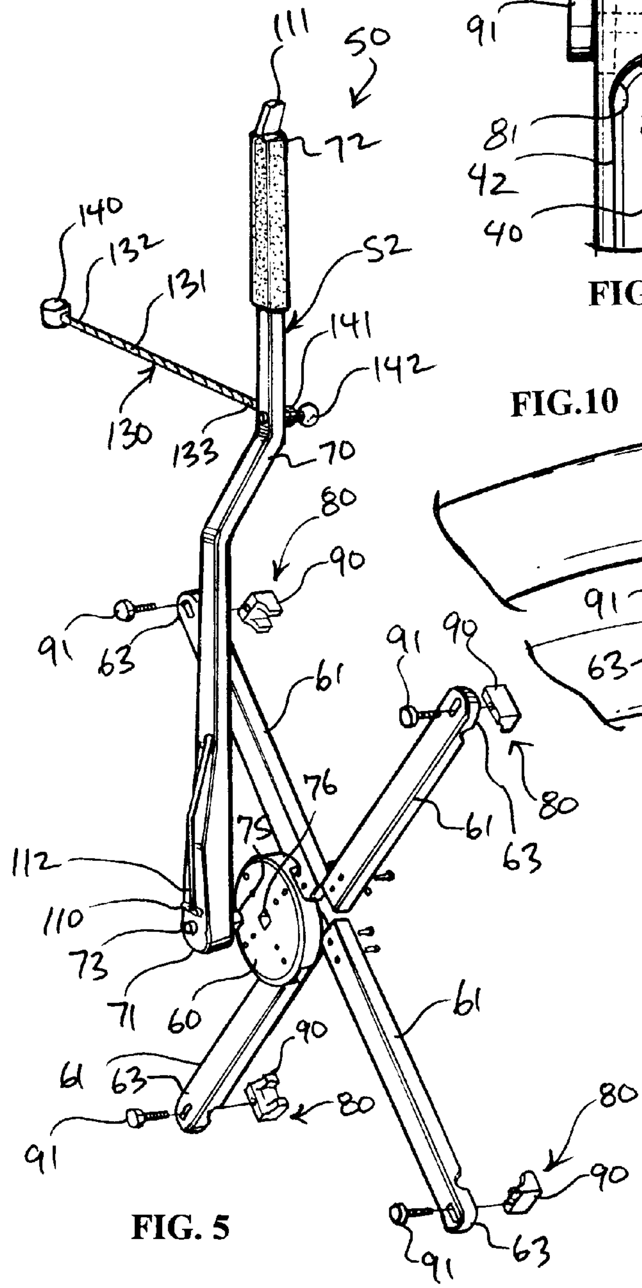
FIG. 5
FIG.10
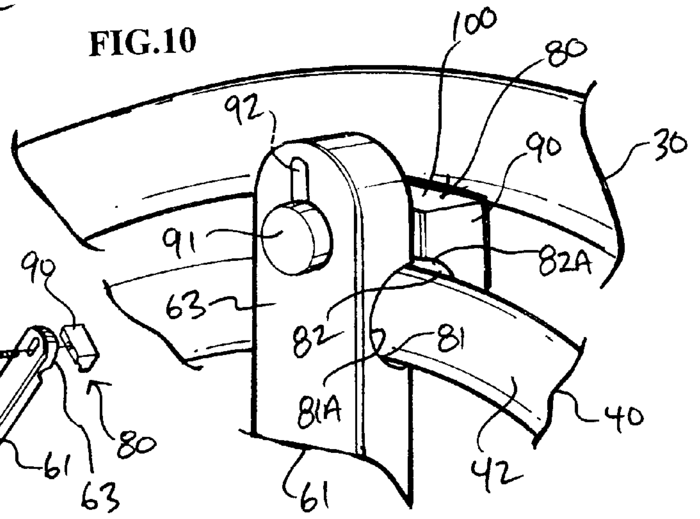
FIG. 13
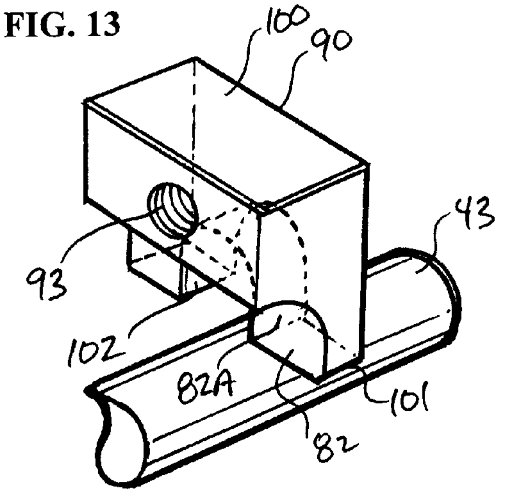

WHEELCHAIR DRIVE ASSEMBLY

FIELD OF THE INVENTION

The present invention relates to wheelchairs and, more particularly, to specialized wheelchair attachments used to assist wheelchair occupants in propelling wheelchairs.

BACKGROUND OF THE INVENTION

A wheelchair is a chair mounted on wheels and is used to provide mobility for physically challenged users. A standard wheelchair consists of a seat and back carried by a chassis fitted with two small front wheels, two large rear wheels, and a footrest. The wide variety of wheelchairs currently available are typically variations on the standard wheelchair and are often configured with customized accessories for satisfying specific needs.

Manual or self-propelled wheelchairs are propelled by the occupant, usually through the application of force applied by hand to circular handrims attached to the large, rear wheels. The handrims are located on the outside of the rear wheels, and normally have a diameter slightly less than that of the rear wheels. Powered wheelchairs incorporate motor-powered drive assemblies used to drive the rear and/or front wheels, and are controlled with a joystick or other control device.

As is well known, many thousands of people are confined to wheelchairs each year, due to illness or accident or other misfortune. People who are confined to wheelchairs have either limited or no mobility in their legs, and, in some instances, limited or no mobility in their arms, particularly among those who are partially or completely paralyzed or who have suffered debilitating injury to their arms. Those confined to wheelchairs and who have either partial or complete use of their arms often prefer manual or self-propelled wheelchairs because they require use of their arms to propel the wheelchair. Propelling a wheelchair with the arms has numerous health and mental benefits. Propelling a wheelchair with the arms strengthens the muscles of the arms and can provide cardiovascular benefits as well for those who use their wheelchairs in sports and sport-related activities and long-distance wheelchair training and racing. Because having to use a wheelchair takes away a measure of personal independence, maneuvering a wheelchair manually provides a corresponding measure of independence and control in an otherwise difficult situation, which can increase confidence, personal awareness, and self-image.

In an effort to increase the usefulness of manual or self-propelled wheelchairs, skilled artisans have developed specialized wheelchair attachments for manually propelling wheelchairs that are activated with the use of levers operatively coupled to the rear wheels. The levers are taken up by hand and moved back and forth with the arms, which, in turn, imparts rotation to the rear wheels thereby propelling the wheelchair. Use of such lever-operated wheelchairs serves to strengthen the muscles of the arms and hands, and can provide cardiovascular benefits when used in sports and sport-related activities and long-distance wheelchair training and racing. Furthermore, lever-operated wheelchairs are often capable of achieving higher rates of speed as compared to standard wheelchairs.

Although the advent of lever-operated wheelchairs represents a significant advancement in the art of wheelchairs, none have been entirely satisfactory. For instance, existing lever-operated wheelchairs are difficult to construct, expensive, structurally complicated, difficult to repair, and are unreliable and prone to breakage. Given these and other deficiencies in the art, those having regard for the art will readily appreciate that continued improvement in the field of self-propelled wheelchairs is needed.

SUMMARY OF THE INVENTION

In a wheelchair including a seat carried by a frame having opposed forward and rearward ends, a rear wheel having a first diameter mounted for rotation about an axis of rotation to the frame on either side of the seat proximate to the rearward end of the frame, at least one front wheel mounted to the frame proximate to the forward end of the frame, a circular handrim located outboard of one of the rear wheels encircling the axis of rotation and having a second diameter slightly less than the first diameter of the one of the rear wheels and an inner side facing the one of the rear wheels and an opposed outer side, and spaced-apart connecting pins coupling the inner side of the circular handrim to the one of the rear wheels, improvements therein according to the principle of the invention include a framework having extremities each juxtaposed along the outer side of the handrim opposing one of the connecting pins, a clamp releasably securing each outer extremity to the handrim proximate to one of the connecting pins including a clamp element thereof carried by the outer extremity in juxtaposition to the outer side of the handrim and a complemental clamp element thereof in juxtaposition to the inner side of the handrim proximate to the connecting pin connected to the clamp element and together with the clamp element releasably embracing the handrim, a lever having an inner end and an opposed outer end, and a ratchet operatively coupling the inner end of the lever to the framework proximate to the axis of rotation of the one of the rear wheels, the lever extending upwardly from the inner end at the ratchet to the outer end allowing a user seated in the seat of the wheelchair to grasp the outer end of the lever and move the lever between a first position and a second position, in which the ratchet acts on the framework to impart rotation to the one of the rear wheels in response to movement of the lever between the first and second positions. The complemental clamp element of at least one of the clamps interacts with the connecting pin adjacent thereto preventing the framework from rotating relative to the one of the rear wheels. A bias is applied to the lever biasing the lever into one of the first and second positions. The bias is applied by at least one biasing member coupled between the lever and the frame. The at least one biasing member includes at least one cord of elastic material in the preferred embodiment. The ratchet is associated with a first switch, which is movable between a first position for placing the ratchet in a first condition for acting on the framework to impart rotation to the one of the rear wheels in a clockwise direction in response to movement of the lever between the first and second positions, and a second position for placing the ratchet in a second condition for acting on the framework to impart rotation to the one of the rear wheels in a counter clockwise direction in response to movement of the lever between the first and second positions. A second switch carried by the lever is operatively coupled to the first switch, in which the first switch moves between the first and second positions thereof in response to movement of the second switch. The second switch is preferably located adjacent to the outer end of the lever.

In a wheelchair including a seat carried by a frame having opposed forward and rearward ends, a rear wheel having a first diameter mounted for rotation about an axis of rotation to the frame on either side of the seat proximate to the rearward end of the frame, at least one front wheel mounted to the frame proximate to the forward end of the frame, a circular handrim located outboard of one of the rear wheels encircling the axis of rotation and having a second diameter slightly less than the first diameter of the one of the rear wheels and an inner side facing the one of the rear wheels and an opposed outer side, and spaced-apart connecting pins coupling the inner side of the circular handrim to the one of the rear wheels, improvements therein according to the principle of the invention include a framework secured to the handrim, a lever having an inner end and an opposed outer end, a ratchet operatively coupling the inner end of the lever to the framework proximate to the axis of rotation of the one of the rear wheels, the lever extending upwardly from the inner end at the ratchet to the outer end allowing a user seated in the seat of the wheelchair to grasp the outer end of the lever and move the lever between a first position and a second position, the ratchet for acting on the framework to impart rotation to the one of the rear wheels in response to movement of the lever between the first and second positions, and a bias applied to the lever biasing the lever into one of the first and second positions. The bias is applied by at least one biasing member coupled between the lever and the frame. The at least one biasing member includes at least one cord of elastic material in the preferred embodiment. The framework includes extremities each juxtaposed along the outer side of the handrim opposing one of the connecting pins, and a clamp is provided at each outer extremity. Each clamp includes a clamp element by the outer extremity in juxtaposition to the outer side of the handrim and a complemental clamp element in juxtaposition to the inner side of the handrim and is mounted to the outer extremity for movement in reciprocal directions between a first position away from the handrim and a second position engaging the handrim, whereby in a clamped position of the clamp the complemental clamp element of the clamp is disposed in the second position engaging the handrim and together with the clamp element releasably embraces the handrim. The complemental element of at least one of the clamps interacts with the connecting pin adjacent thereto preventing the framework from rotating relative to the one of the rear wheels. The ratchet is associated with a first switch, which is movable between a first position for placing the ratchet in a first condition for acting on the framework to impart rotation to the one of the rear wheels in a clockwise direction in response to movement of the lever between the first and second positions, and a second position for placing the ratchet in a second condition for acting on the framework to impart rotation to the one of the rear wheels in a counter clockwise direction in response to movement of the lever between the first and second positions. A second switch carried by the lever is operatively coupled to the first switch, in which the first switch moves between the first and second positions thereof in response to movement of the second switch. The second switch is preferably located adjacent to the outer end of the lever.

In a wheelchair including a seat carried by a frame having opposed forward and rearward ends, a rear wheel having a first diameter mounted for rotation about an axis of rotation to the frame on either side of the seat proximate to the rearward end of the frame, at least one front wheel mounted to the frame proximate to the forward end of the frame, a circular handrim located outboard of one of the rear wheels encircling the axis of rotation and having a second diameter slightly less than the first diameter of the one of the rear wheels and an inner side facing the one of the rear wheels and an opposed outer side, and spaced-apart connecting pins coupling the inner side of the circular handrim to the one of the rear wheels, improvements therein according to the principle of the invention include a framework including arms each having an outer extremity juxtaposed along the outer side of the handrim opposing one of the connecting pins, and extending inwardly therefrom to an inner extremity affixed to a hub encircled by the handrim, a clamp releasably securing the outer extremity of each of the arms to the handrim proximate to one of the connecting pins including a clamp element thereof carried by the outer extremity of the arm in juxtaposition to the outer side of the handrim and a complemental clamp element thereof in juxtaposition to the inner side of the handrim connected to the clamp element and together with the clamp element releasably embracing the handrim, a lever having an inner end and an opposed outer end, and a ratchet operatively coupling the inner end of the lever to the hub proximate to the axis of rotation of the one of the rear wheels, the lever extending upwardly from the inner end at the ratchet to the outer end allowing a user seated in the seat of the wheelchair to grasp the outer end of the lever and move the lever between a first position and a second position, in which the ratchet acts on the framework to impart rotation to the one of the rear wheels in response to movement of the lever between the first and second positions. The complemental clamp element of at least one of the clamps interacts with the connecting pin adjacent thereto preventing the framework from rotating relative to the one of the rear wheels. A bias is applied to the lever biasing the lever into one of the first and second positions. The bias is applied by at least one biasing member coupled between the lever and the frame. The at least one biasing member includes at least one cord of elastic material in a preferred embodiment. The ratchet is associated with a first switch, which is movable between a first position for placing the ratchet in a first condition for acting on the framework to impart rotation to the one of the rear wheels in a clockwise direction in response to movement of the lever between the first and second positions, and a second position for placing the ratchet in a second condition for acting on the framework to impart rotation to the one of the rear wheels in a counter clockwise direction in response to movement of the lever between the first and second positions. A second switch carried by the lever is operatively coupled to the first switch, in which the first switch moves between the first and second positions thereof in response to movement of the second switch. Preferably, the second switch is located adjacent to the outer end of the lever.

Consistent with the foregoing summary of preferred embodiments, and the ensuing detailed description, which are to be taken together, the invention also contemplates associated embodiments.

BRIEF DESCRIPTION OF THE DRAWINGS

Referring to the drawings:

FIG. 5 is a partially exploded perspective view of the drive assembly of FIG. 1;

FIG. 10 is a fragmented perspective view of the wheel, the handrim, and the framework of FIG. 1 illustrating a clamp clamping the framework to the handrim of FIG. 1;

FIG. 11 is a fragmented side elevational view of the clamp of FIG. 10 clamping the framework to the handrim;

FIG. 13 is an enlarged perspective view of a block of the clamp of FIG. 10 shown as it would appear overlying the connecting pin of FIG. 12.

DETAILED DESCRIPTION OF PREFERRED EMBODIMENTS

Figure 1:
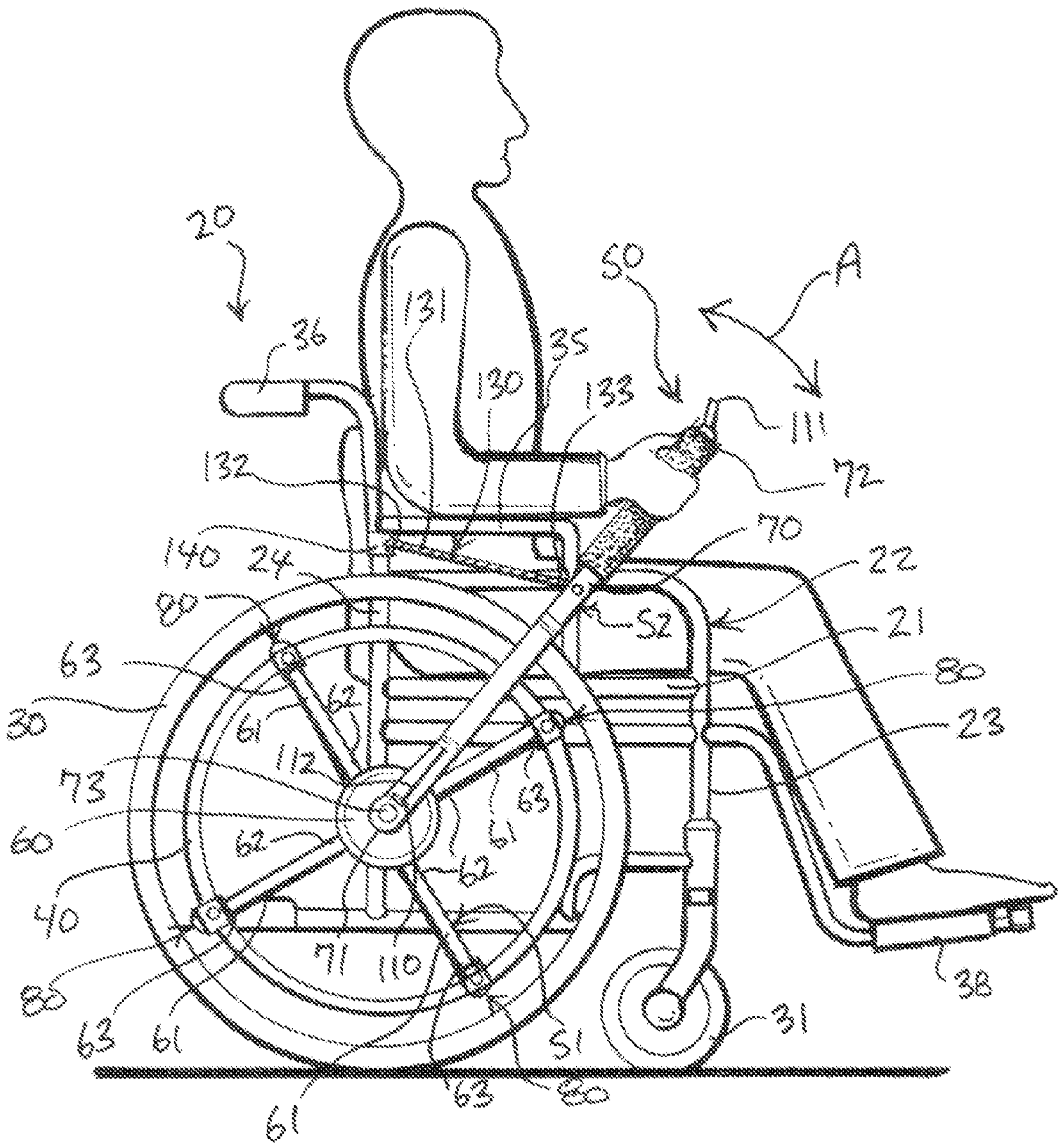
FIG. 1 is a side elevational view of a wheelchair having a drive assembly mounted thereon including a ratchet coupling a lever to a framework mounted to a handrim attached to a wheel of the wheelchair, and a biasing member coupled between the wheelchair and the lever applying a bias to the lever.
Figure 2:
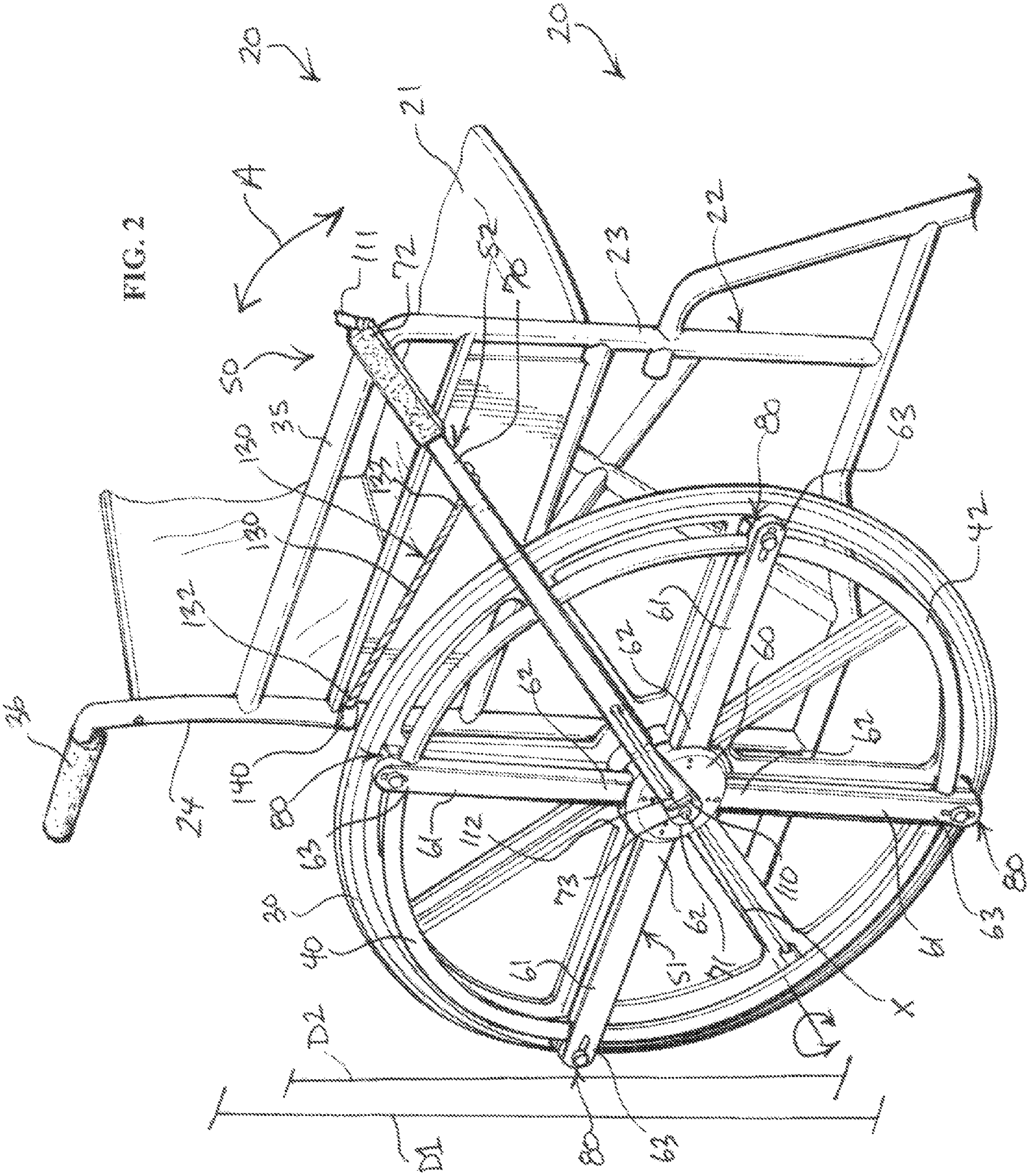
FIG. 2 is an enlarged fragmented perspective view of the wheelchair of FIG. 1 illustrating the drive assembly mounted thereon.

Turning now to the drawings, in which like reference characters indicate corresponding elements throughout the several views, attention is first directed to FIGS. 1 and 2 in which there is seen a wheelchair 20 including a seat 21 carried by a frame 22 having opposed forward and rearward ends 23 and 24, and a rear wheel 30 having a diameter D1 (FIG. 2) mounted for rotation about an axis of rotation X (FIG. 2) to frame 22 on either side of seat 21 proximate to rearward end 24 of frame 22. Only one of rear wheels 30 is shown. Two opposed front swiveled castor wheels 31 (only one shown) are mounted to frame 22 proximate to forward end 23 of frame 22. Rear wheels 30 are used for propulsion by an occupant sitting in seat 21 of wheelchair 20, and wheels 31 at forward end 23 of frame 22 allow for directional control. Although wheelchair incorporates two front wheels 31 in the present embodiment, less or more may be used as desired. An arm rest 35 (only one shown) is provided on each side of frame 22 in any conventional manner. Two handles 36 (only one shown) are attached to frame 22 at rearward end 24 and extend upwardly and rearwardly therefrom in a conventional manner to provide propulsion from a caregiver in certain applications. A footrest 38 is attached to forward end 23 of frame 22 in a conventional manner.

Figure 12:
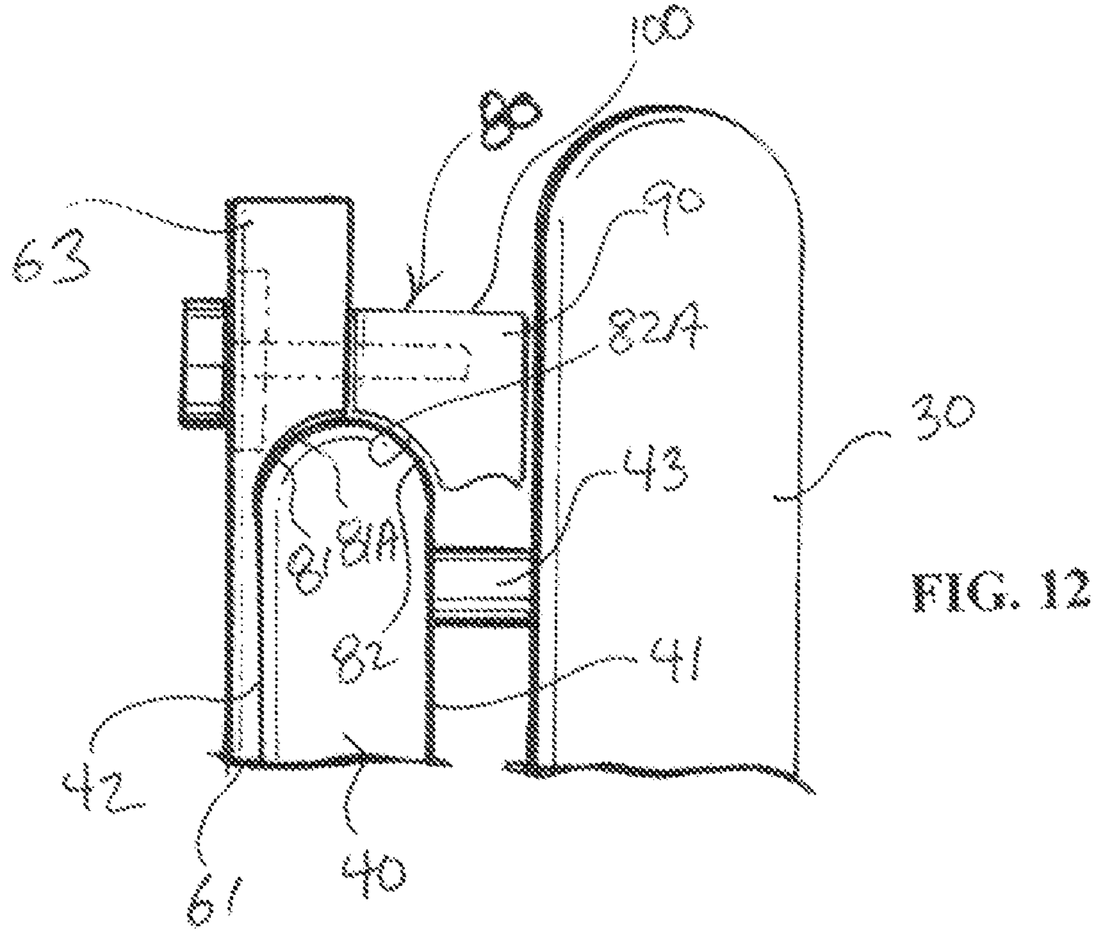
FIG. 12 is a view very similar to that of FIG. 11 with portions of the clamp broken away for illustrative purposes illustrating a connecting pin connecting the wheel to the handrim.

Referencing FIG. 2, rear wheel 30 is fashioned conventionally with a circular handrim 40 located outboard of rear wheel 30 encircling axis of rotation X having a diameter D2 (FIG. 2) slightly less than diameter D1 of rear wheel 30, and, as seen in FIG. 12, an inner side 41 facing rear wheel 30 and an opposed outer side 42. Spaced-apart connecting lugs or pins 43 are provided connecting inner side 41 of handrim 40 to rear wheel 30 and maintain handrim 40 spaced from, and outboard of, rear wheel 30. Although not shown, the opposed rear wheel is also configured with a similar handrim.

Set forth for the purpose of orientation and reference, wheelchair 20 is generally representative of a typical manual or self-propelled wheelchair. Seat 21, frame 22, rear wheels 30 including handrims 40, front wheels 31, arm rests 35, handles 36, and footrest 38 are relatively standard components, further details of which are well known and will readily occur to the skilled artisan and, therefore, will not be discussed in further detail.

Figure 4:
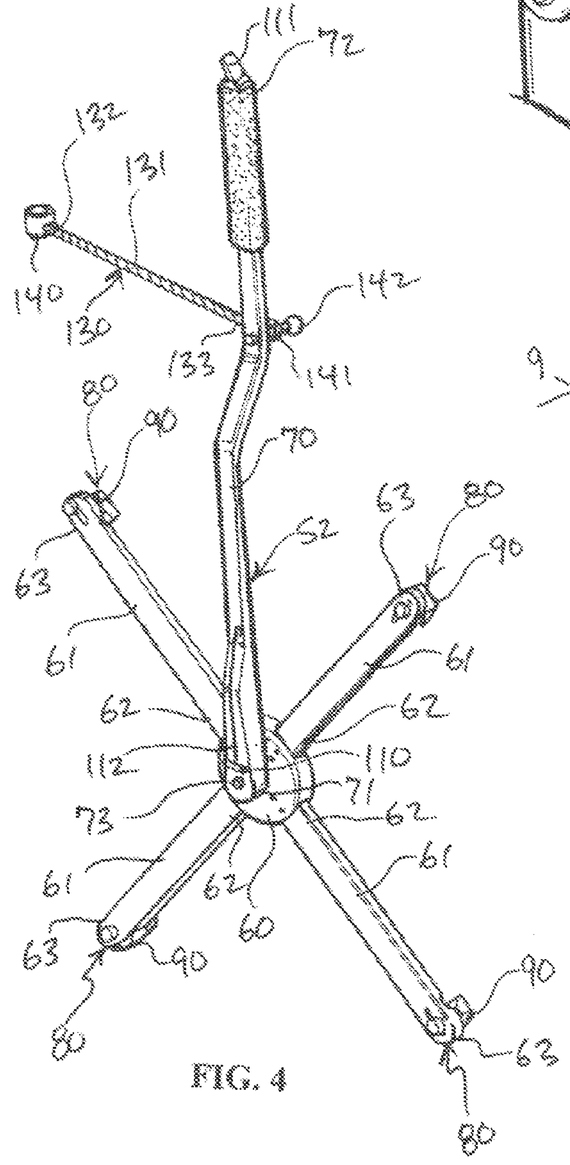
FIG. 4 is a perspective view of the drive assembly of FIG. 1.

Referring to FIGS. 1 and 2, attached to wheelchair 20 is a wheelchair drive assembly designated generally at 50, which is used by the occupant of wheelchair 20 to propel wheelchair 20, in accordance with the principle of the invention. Referring also to FIGS. 4 and 5, assembly 50 includes a framework 51 and a lever 52. Framework 51 is fashioned of steel, aluminum, carbon fiber, plastic, or other substantially rigid material or combination of materials, and consists of a central hub 60 and a plurality of arms 61 each of substantially equal size and length and each including an inner extremity 62 and an opposed outer extremity 63. Inner extremities 62 of arms 61 are affixed to hub 60, and arms 61 radiate outwardly therefrom to outer extremities 63. In the present embodiment there are four arms 61 offset at approximately 90 degree spaced intervals as illustrated, although less or more may be employed if so desired. Inner extremities 62 of arms 61 are affixed to hub with fasteners, such as screws, rivets, nut-and-bolt assemblies, or the like, and may, if desired, be welded to hub 60 or perhaps fashioned integrally with hub 60.

Figure 7:
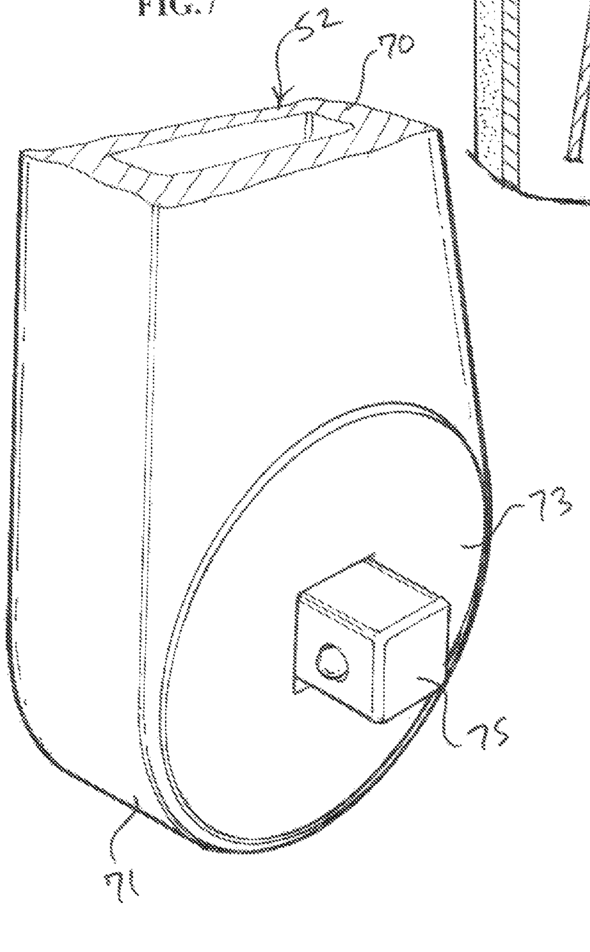
FIG. 7 is an enlarged fragmented perspective view of the lever of FIG. 1 illustrating an inner end thereof incorporating a ratchet.
Figure 6:
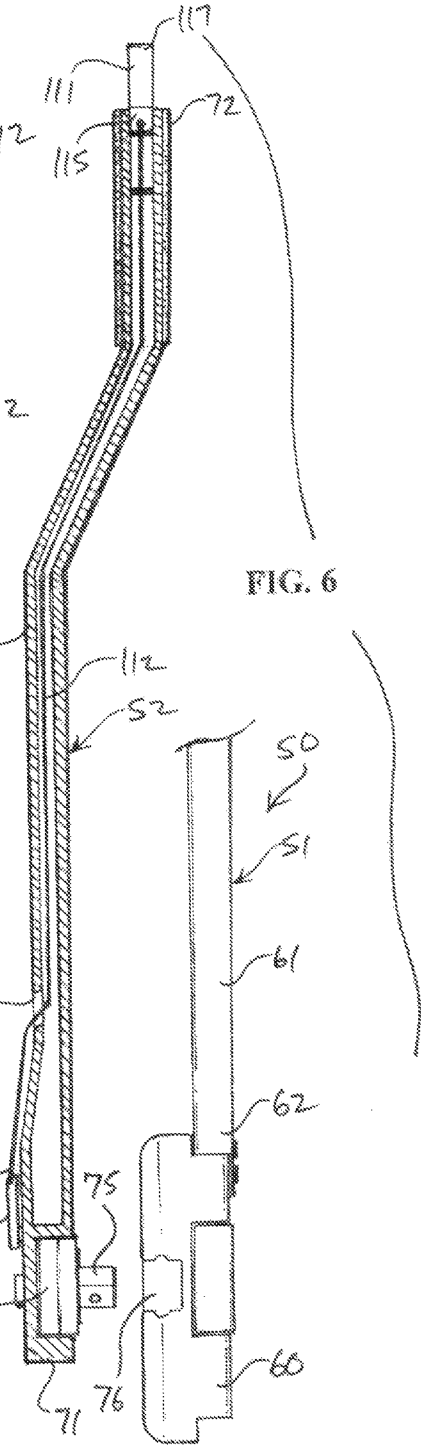
FIG. 6 is a vertical sectional view of the lever and a hub of the framework.

Lever 52 is an elongate, rigid bar 70 having an inner end 71 and an opposed outer end 72. As illustrated in FIGS. 6 and 7, inner end 71 of bar 70 is fashioned with a ratchet denoted at 73. Ratchet 73 is entirely conventional, and in the present embodiment is the well-known type of ratchet commonly found in connection with ratcheting socket wrenches, although other conventional forms of ratchets can be used without departing from the invention. Ratchet 73 incorporates an outwardly projecting key 75, which is received by a corresponding keyway 76 formed centrally in hub 60 as illustrated in FIG. 6 coupling inner end 71 of lever 52 to hub 60. The arrangement of key 75 and keyway 76 is common and well-known in the field of ratcheting socket wrenches, further details of which are known, will readily occur to the skilled artisan, and will not be discussed in further detail. Furthermore, key 75 and keyway 76 are considered part of ratchet 73 coupling inner end 71 of lever 52 to hub 60.

Referring to FIG. 2, framework 51 is applied to outer side outer 42 of handrim, whereby hub 60 is located in the region of axis of rotation X and is encircled by handrim 40, and keyway 76 is disposed at axis of rotation X. Arms 61 are specifically sized such that they radiate outwardly from hub 60 to outer extremities 63 juxtaposed along outer side 42 of handrim 40 each opposing one of the connecting pins 43 connecting handrim 40 to rear wheel 30, in accordance with the principle of the invention. A clamp 80 releasably secures the outer extremity 63 of each of the arms 61 to handrim 40 securing framework 51 to handrim 40 as illustrated. The clamps are each identical, and the structure of just one clamp will be discussed with the understanding that the ensuing discussion applies to each clamp.

Referencing FIG. 11, the outer extremity 63 of one of the arms 61 is illustrated juxtaposed along outer side 42 of handrim 40 opposing connecting pin 43 and is releasably secured to handrim 40 with clamp 80. Clamp 80 includes a clamp element 81 and a complemental clamp element 82. Clamp element 81 is carried by outer extremity 63 of arm 61 in juxtaposition to outer side 42 of handrim 40, and the corresponding complemental clamp element 82 is located in juxtaposition to inner side 41 of handrim 40 and is connected to clamp element 81 and together with clamp element 81 releasably embraces handrim 40.

Referring also to FIG. 10, clamp element 81 consists of outer extremity 63 of arm 61 formed with a receiving area or recess 81A, which receives handrim 40. Complemental clamp element 82 consists of a block 90 formed with a receiving area or recess 82A. Block 90 is positioned between outer extremity 63 and wheel 30. Referencing FIG. 10, a threaded fastener 91 extends through an elongated slot 92 formed in outer extremity 63 of arm 61, and is threadably received in a corresponding threaded opening 93 (shown only in FIG. 13) formed in block 90 and is tightened, such as by hand or with the aid of a tool such as a wrench or screwdriver or other selected tool, thereby drawing block 90 toward outer extremity 63 of arm 61 placing clamp 80 in a clamped position clamping handrim by and between recess 81A of clamp element 81 and recess 82A of complemental clamp element 82.

Due to the elongated configuration of elongated slot 92, loosening fastener 91 allows a certain amount of play allowing fastener 91 and block 90 attached thereto to be moved in reciprocal directions relative to outer extremity 63 and clamp element 82 as indicated by the double arrowed line B in FIG. 11, upwardly and downwardly, relative to handrim 40 allowing one to easily maneuver complemental clamp element 82 into engagement with handrim 40 prior to tightening fastener 91. In other words, complemental clamp element 82 being mounted to block 90 is, in turn, mounted to outer extremity 63 for movement in reciprocal directions as indicated by the double arrowed line B in FIG. 11 between a first position away from handrim 40 and a second position engaging handrim 40 as shown, whereby in the clamped position of clamp 80 complemental clamp element 82 of clamp 80 is disposed in the second position engaging handrim 40 and together with clamp element 81 releasably embraces handrim 40.

Referencing FIG. 13, block 90 has opposed upper and lower ends 100 and 101. Lower end 101 is bifurcated as illustrated forming a receiving area 102 constituting part of, or otherwise an extension of, complemental clamp element 82. By maneuvering block 90, and due to the specific positioning of outer extremity 63 of the corresponding arm 61 opposite to the corresponding connecting pin 43, lower end 101 of block 90 is maneuvered toward handrim 40 bringing complemental clamp element 82 into engagement with handrim 40 while concurrently locating connecting pin 43 in receiving area 102 formed in lower end 101 of block 90. In FIG. 12, lower end 101 of block 90 is broken away for illustrative purposes illustrating connecting pin 43 extending between rear wheel 30 and handrim 40.

Receiving area 102 illustrated in FIG. 13 is specifically sized to accept and capture connecting pin 43 therein extending between wheel 30 and inner side 41 of handrim 40. After tightening fastener 91 thereby clamping handrim 40 between clamp element 81 and complemental clamp element 82 of clamp 80, the interaction of connecting pin 43 with receiving area 102 of complemental clamp element 82 formed in lower end 101 of block 90 prevents outer extremity 63 of arm 61 from migrating along the length of handrim 40 thereby preventing framework 51 from rotating relative to handrim 40 and, thus, relative to rear wheel 30. Again, outer extremities 63 of arms 61 so clamped to handrim 40 with a clamp 80 thereby releasably securing framework 51 to handrim 40 prevent framework 51 from rotating relative to handrim 40 and rear wheel 30 as a result of the interaction between the complemental clamp elements and the corresponding connecting pins 43 connecting handrim 40 to rear wheel 30 as discussed above in accordance with the principle of the invention. Moreover, clamps 80 clamping outer extremities 63 of arms 61 to handrim 40 concurrently secure the corresponding connecting pins 43 preventing rotation of framework 51 relative to handrim 40. Reversing the procedure used to install framework 51 to handrim 40 need only be reversed to detaching framework from handrim 40. If desired, only one clamp can be configured to secure a corresponding connecting pin 43 as discussed above to prevent relative rotation of framework 51 relative to handrim 40.

As previously indicated, ratchet 73, including key 75 and keyway 76, couples inner end 71 of lever 52 to hub 60 at axis of rotation X denoted in FIG. 2. Framework 51 is attached to handrim 40 of rear wheel 30 such that lever 52 extends upwardly and forwardly from hub 60 toward seat 21 as illustrated in FIGS. 1 and 2 from inner end 71 connected to hub 60 at axis of rotation X to outer end 72 directed upwardly relative to seat 21 allowing a user seated in seat 21 of wheelchair 20 to grasp outer end 72 as illustrated in FIG. 1. Outer end 72 is a handle to be taken up by hand, and is enwrapped with a soft outer layer, such as rubber or cloth or foam of the like, for providing a comfortable grip.

Ratchet 73 operatively couples inner end 71 of lever 52 to hub 60 proximate axis of rotation X of rear wheel 30. By taking up outer end 72 of lever 52 by hand, an occupant seated in seat 21 of wheelchair may act on lever 52 moving it back and forth between rearward and forward positions as indicated by the arcuate double arrowed line A in FIGS. 1 and 2 between a first position upwardly and rearwardly toward rearward end 24 of wheelchair 20 and a second position downwardly and forwardly away from rearward end 24 of wheelchair. The coupling between hub 60 and inner end 71 of lever 52 with ratchet 73 causes ratchet to act on framework 51 to impart rotation to rear wheel 30 in response to movement of lever 52 back and forth between the first and second positions thereof thereby propelling wheelchair 20 over a surface.

Figure 3:
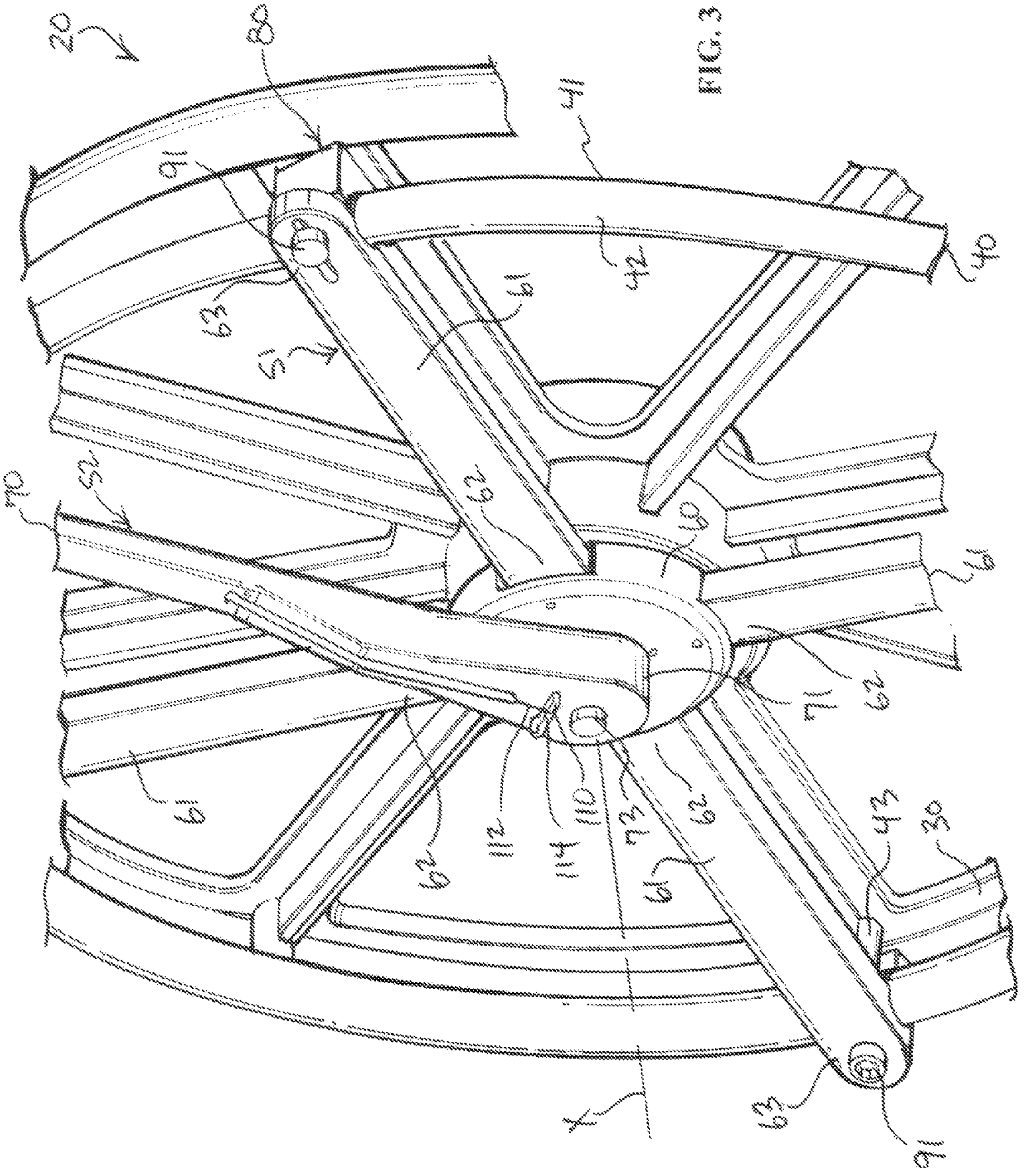
FIG. 3 is an enlarged fragmented perspective view of a wheel of the wheelchair of FIG. 1 illustrating the drive assembly mounted thereon.

Looking to FIG. 3, ratchet 73 is configured with a ratchet switch 110 incorporated with inner end 71 of lever 52, which is pivots between a first position for placing ratchet 73 in a first condition for acting on framework 51 to impart rotation to rear wheel 30 in a clockwise direction in response to movement of lever 52 between the first and second positions thereof, and a second position for placing ratchet 73 in a second condition for acting on framework 51 to impart rotation to rear wheel 30 in a counter clockwise direction in response to movement of lever 52 between the first and second positions thereof. By utilizing ratchet switch 110, an occupant of wheelchair 20 may propel wheel chair forwardly in the first position of ratchet switch 110, and rearwardly in the second position of ratchet switch 110.

In the first position of ratchet switch 110, ratchet 73 rotates in only a rearward or counterclockwise direction, whereby in response to movement of lever 52 from its rearward or starting position to its forward position ratchet 73 secures locking lever 52 relative to framework 51 thereby imparting clockwise rotation to wheel 30 thereby propelling wheelchair 20 forwardly. Because in the first position of ratchet switch 110 ratchet 73 rotates in only the rearward or counterclockwise direction, lever 52 is permitted to move freely from its forward position back to its original starting or rearward position without interfering with the rotation of rear wheel 30.

In the second position of ratchet switch 110, ratchet 73 rotates in only a forward or clockwise direction, whereby in response to movement of lever 52 from its forward position to its rearward position ratchet 73 secures locking lever 52 relative to framework 51 thereby imparting counterclockwise rotation to wheel 30 thereby propelling wheelchair 20 rearwardly. Because in the second position of ratchet switch 110 ratchet 73 rotates in only the forward or clockwise direction, lever 52 is permitted to move freely from its rearward position back to its original starting or forward position without interfering with the rotation of rear wheel 30.

Ratchet switch 110 is entirely conventional and is routinely incorporated with ratcheting socket wrenches for driving sockets in clockwise and counter clockwise directions for tightening and loosening fasteners. Ratchet switch 110 is located exteriorly relative to inner end 71 of lever 52, and may be easily access by an occupant in seat of wheelchair 20. The movement of switch 110 is a pivoting movement in the preferred embodiment disclosed herein.

Figure 8:
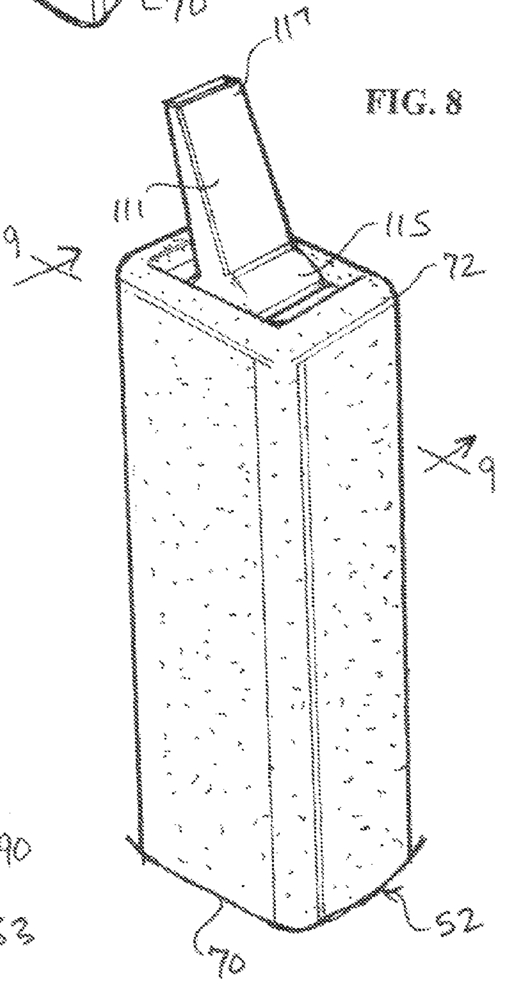
FIG. 8 is an enlarged fragmented perspective of the lever of FIG. 1 illustrating an outer end thereof.
Figure 9:
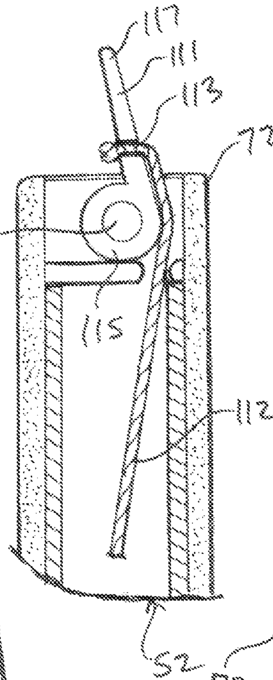
FIG. 9 is a sectional view taken along line 9-9 of FIG. 8.

According to the invention, a switch 111 is pivotally attached to lever 52 at outer end 72 and is operatively coupled to ratchet switch 110, whereby ratchet switch 110 pivots between the first and second positions thereof in response to pivoting of switch 111. In the present embodiment as illustrated in FIG. 8 and FIG. 9, which is a sectional view taken along line 9-9 of FIG. 8, switch 111 is an elongate body having a lower end 115 pivoted to outer end 72 of lever 52 with a pivot pin 116 (not shown in FIG. 8), and an opposed upper end 117 extending upwardly relative to outer end 72 of lever 52, which is taken up by hand and used to pivot switch 111 back and forth for, in turn, pivoting ratchet switch 110 between the first and second positions thereof.

In the present embodiment, switch 111 is operatively coupled to ratchet switch 110 with a metal cable 112 having an upper end 113 secured to switch 111 between lower end 115 and upper end 117 thereof, and an opposing lower end 114 secured to ratchet switch 110 as best illustrated in FIGS. 3 and 6. Cable 112 extends downwardly through the interior of bar 70 forming lever 52 from upper end 113 at switch 111 and outwardly through an opening 120 formed in bar 70 toward inner end 71 of lever 52 and from there downwardly to lower end 114 at inner end 71, which is secured to ratchet switch 110. Cable 112 is substantially rigid and inflexible along its length from upper end 113 to lower end 114. In response to pivoting switch 111, cable 112 is made to reciprocate back and forth along the length of lever 52, which, in turn, pivots ratchet switch 110 between the first and second positions thereof. Although cable 112 is used in the present embodiment to operatively couple switch 111 to ratchet switch 110, other power transfer mechanisms may be used, such as a linkage assembly or other selected structure.

As previously mentioned, movement of lever 52 back and forth as indicated by the arcuate double arrowed line A in FIGS. 1 and 2 between the first and second positions thereof acts of ratchet 73 thereby imparting rotation to rear wheel 30 through the attachment of framework 51 to handrim 40. In the first position of ratchet switch 110 movement of lever 52 back and forth between the first and second positions acts on ratchet 73 imparting clockwise rotation to rear wheel 30 providing forward movement of wheelchair 20, and in the second position of ratchet switch 110 movement of lever 52 back and forth between the first and second positions thereof acts on ratchet 73 imparting counterclockwise rotation to rear wheel 30 providing rearward movement of wheelchair 20. As seen in FIG. 1, lever 52 extends upwardly from hub 60 and somewhat forwardly of hub 60. A bias is applied to lever 52, which biases lever 52 into the first position thereof upwardly toward rearward end 24 thereby maintaining outer end 72 of lever 52 at an initial upwardly directed position relative to seat 21 such that outer end 72 may be initially easily taken up by hand by an occupant occupying seat 21 of wheelchair 20 as seen in FIG. 1. In the present embodiment, the described bias applied to lever 52 is applied by a biasing member 130 in FIGS. 1 and 2 coupled between lever 52 and frame 22.

Figure 14:
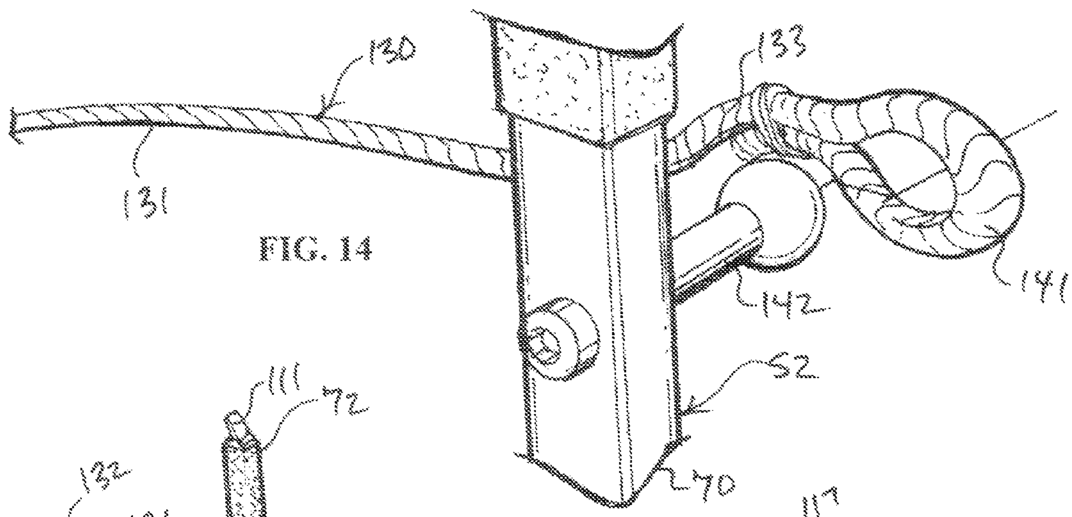
FIG. 14 is an enlarged fragmented perspective view of the lever of FIG. 1 shown as it would appear incorporating a pin for securing a looped end of the biasing member of FIG. 1.

In the present embodiment, biasing member 130 consists of an elastic cord 131 having an end 132 coupled to rearward end 24 of frame 22, and an opposed end 133 coupled to lever 52. Biasing member 130 extends from end 132 at rearward end 24 of frame 22, and forwardly therefrom to end 133 at lever 52. Biasing member 130 is, accordingly, coupled between rearward end 24 of frame 22 and lever 52. In the present embodiment, end 132 of elastic cord 131 is secured to frame 22 with a collar 140, and end 133 of elastic cord 131 is attached to lever 52 adjacent to outer end 72 of lever 52 between outer end 72 and inner end 71. As best seen in FIG. 14, a loop 141 is formed in end 133 of elastic cord 131, which is looped over a pin 142 attached to lever 52 thereby attaching end 133 to lever 52. Loop 141 can be easily removed from pin 142 as needed or desired. Pin 142 is headed, which inhibits loop 141 from inadvertently detaching from pin 142.

Elastic cord 131 is elastically constrictive. With elastic cord 131 attached between frame 22 and lever 52, elastic cord 131 biases lever 52 upwardly toward rearward end 24. When lever 52 is not taken up by hand by an occupant of wheelchair 20 and thus not under a forcible influence, elastic cord 131 biases lever 52 upwardly toward rearward end 24 in what is considered an initial or starting position of lever 52 locating handle upwardly toward rearward end 24 of frame 22 thereby allowing outer end 72 to be initially and easily taken up by hand by an occupant of wheelchair 20 for use in propelling wheelchair 20 as previously discussed. Although one biasing member 130 is disclosed for providing the applied bias to lever 52, more can be used as so desired. Furthermore, although an elastic cord 131 is provided as a preferred embodiment of biasing member 130, other devices may be utilized to provide the applied bias, such as one or more springs, one or more pistons, etc. Furthermore, ends 132 and 133 may be secured to frame 22 and lever 52, respectively, in any suitable manner, such as with collars, pins, through tying, with adhesive, with fasteners such as screws or rivets or the like, etc.

Those having regard for the art will readily appreciate that an exemplary wheelchair 20 and wheelchair drive assembly 50 is disclosed. Assembly 50 is easy to construct, easy to install in connection with a wheelchair, easy to use providing efficient propulsion of the wheelchair, and easy to remove. Assembly 50 is easy to assembly by hand and is easy attach and detach from handrim 40 of wheelchair 20 by hand, and threaded fasteners 91 of clamps 80 are readily tightened to secure framework 51 to handrim 40 and untightened releasing framework 51 from handrim 40, whether by hand or with the aid of a tool, such as a wrench or screwdriver or the like. Installation of assembly 50 with a conventional wheelchair as herein disclosed requires no modification be made to the structure of the wheelchair as assembly 50 readily and easily attaches to the handrim of the rear wheel of the wheelchair.

The invention has been described above with reference to a preferred embodiment. However, those skilled in the art will recognize that changes and modifications may be made to the embodiment without departing from the nature and scope of the invention. For instance, although one rear wheel of wheelchair 20 is configured with a wheelchair drive assembly 50, the opposed rear wheel, similarly configured with a handrim, may similarly be configured with a wheelchair drive assembly 50 constructed and arranged in accordance with the principle of the invention.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. In a wheelchair including a seat carried by a frame having opposed forward and rearward ends, a rear wheel having a first diameter mounted for rotation about an axis of rotation to the frame on either side of the seat proximate to the rearward end of the frame, at least one front wheel mounted to the frame proximate to the forward end of the frame, a circular handrim located outboard of one of the rear wheels encircling the axis of rotation and having a second diameter slightly less than the first diameter of the one of the rear wheels and an inner side facing the one of the rear wheels and an opposed outer side, and spaced-apart connecting pins coupling the inner side of the circular handrim to the one of the rear wheels, improvements therein comprising:

- a framework having extremities each juxtaposed along the outer side of the handrim opposing one of the connecting pins;
- a clamp releasably securing each outer extremity to the handrim proximate to one of the connecting pins including a clamp element thereof carried by the outer extremity in juxtaposition to the outer side of the handrim and a complemental element thereof in juxtaposition to the inner side of the handrim proximate to the connecting pin connected to the clamp element and together with the complemental element releasably embracing the handrim;
- a lever having an inner end and an opposed outer end;
- a ratchet operatively coupling the inner end of the lever to the framework proximate to the axis of rotation of the one of the rear wheels, the lever extending upwardly from the inner end at the ratchet to the outer end allowing a user seated in the seat of the wheelchair to grasp the outer end of the lever and move the lever between first and second positions;
- the ratchet for acting on the framework to impart rotation to the one of the rear wheels in response to movement of the lever between the first and second positions; and
- the complemental element of at least one of the clamps interacting with the connecting pin adjacent thereto preventing the framework from rotating relative to the one of the rear wheels.

2. The improvements according to claim 1, further comprising a bias applied to the lever biasing the lever into one of the first and second positions.

3. The improvements according to claim 2, wherein the bias is applied by at least one biasing member coupled between the lever and the frame.

4. The improvements according to claim 3, wherein the at least one biasing member comprises at least one cord of elastic material.

5. The improvements according to claim 1, further comprising a first switch movable between a first position for placing the ratchet in a first condition for acting on the framework to impart rotation to the one of the rear wheels in a clockwise direction in response to movement of the lever between the first and second positions, and a second position for placing the ratchet in a second condition for acting on the framework to impart rotation to the one of the rear wheels in a counter clockwise direction in response to movement of the lever between the first and second positions.

6. The improvements according to claim 5, further comprising a second switch carried by the lever operatively coupled to the first switch, in which the first switch moves between the first and second positions thereof in response to movement of the second switch.

7. The improvements according to claim 6, wherein the second switch located adjacent to the outer end of the lever.

8. In a wheelchair including a seat carried by a frame having opposed forward and rearward ends, a rear wheel having a first diameter mounted for rotation about an axis of rotation to the frame on either side of the seat proximate to the rearward end of the frame, at least one front wheel mounted to the frame proximate to the forward end of the frame, a circular handrim located outboard of one of the rear wheels encircling the axis of rotation and having a second diameter slightly less than the first diameter of the one of the rear wheels and an inner side facing the one of the rear wheels and an opposed outer side, and spaced-apart connecting pins coupling the inner side of the circular handrim to the one of the rear wheels, improvements therein comprising:

- a framework secured to the handrim;
- a lever having an inner end and an opposed outer end;
- a ratchet operatively coupling the inner end of the lever to the framework proximate to the axis of rotation of the one of the rear wheels, the lever extending upwardly from the inner end at the ratchet to the outer end allowing a user seated in the seat of the wheelchair to grasp the outer end of the lever and move the lever between a first position and a second position;
- the ratchet for acting on the framework to impart rotation to the one of the rear wheels in response to movement of the lever between the first and second positions;
- a bias applied to the lever biasing the lever into one of the first and second positions;
- the framework including outer extremities each juxtaposed along the outer side of the handrim opposing one of the connecting pins;
- a clamp releasably securing each outer extremity to the handrim proximate to one of the connecting pins including a clamp element thereof carried by the outer extremity in juxtaposition to the outer side of the handrim and a complemental element thereof in juxtaposition to the inner side of the handrim mounted to the outer extremity for movement in reciprocal directions between a first position away from the handrim and a second position engaging the handrim;
- the complemental element of the clamp disposed in the second position engaging the handrim and together with the clamp element releasably embracing the handrim; and
- the complemental element of at least one of the clamps interacting with the connecting pin adjacent thereto preventing the framework from rotating relative to the one of the rear wheels.

9. The improvements according to claim 8, wherein the bias is applied by at least one biasing member coupled between the lever and the frame.

10. The improvements according to claim 9, wherein the at least one biasing member comprises at least one cord of elastic material.

11. The improvements according to claim 8, further comprising a first switch movable between a first position for placing the ratchet in a first condition for acting on the framework to impart rotation to the one of the rear wheels in a clockwise direction in response to movement of the lever between the first and second positions, and a second position for placing the ratchet in a second condition for acting on the framework to impart rotation to the one of the rear wheels in a counter clockwise direction in response to movement of the lever between the first and second positions.

12. The improvements according to claim 11, further comprising a second switch carried by the lever operatively coupled to the first switch, in which the first switch moves between the first and second positions thereof in response to movement of the second switch.

13. The improvements according to claim 12, wherein the second switch located adjacent to the outer end of the lever.

14. In a wheelchair including a seat carried by a frame having opposed forward and rearward ends, a rear wheel having a first diameter mounted for rotation about an axis of rotation to the frame on either side of the seat proximate to the rearward end of the frame, at least one front wheel mounted to the frame proximate to the forward end of the frame, a circular handrim located outboard of one of the rear wheels encircling the axis of rotation and having a second diameter slightly less than the first diameter of the one of the rear wheels and an inner side facing the one of the rear wheels and an opposed outer side, and spaced-apart connecting pins coupling the inner side of the circular handrim to the one of the rear wheels, improvements therein comprising:

a framework including arms each having an outer extremity juxtaposed along the outer side of the handrim opposing one of the connecting pins, and extending inwardly therefrom to an inner extremity affixed to a hub encircled by the handrim;

a clamp releasably securing the outer extremity of each of the arms to the handrim proximate to one of the connecting pins including a clamp element thereof carried by the outer extremity of the arm in juxtaposition to the outer side of the handrim and a complemental element thereof in juxtaposition to the inner side of the handrim connected to the clamp element and together with the complemental element releasably embracing the handrim;

a lever having an inner end and an opposed outer end;

a ratchet operatively coupling the inner end of the lever to the hub proximate to the axis of rotation of the one of the rear wheels, the lever extending upwardly from the inner end at the ratchet to the outer end allowing a user seated in the seat of the wheelchair to grasp the outer end of the lever and move the lever between a first position and a second position away from the seat;

the ratchet for acting on the framework to impart rotation to the one of the rear wheels in response to movement of the lever between the first and second positions; and the complemental element of at least one of the clamps interacting with the connecting pin adjacent thereto preventing the framework from rotating relative to the one of the rear wheels.

15. The improvements according to claim 14, further comprising a bias applied to the lever biasing the lever into one of the first and second positions.

16. The improvements according to claim 15, wherein the bias is applied by at least one biasing member coupled between the lever and the frame.

17. The improvements according to claim 16, wherein the at least one biasing member comprises at least one cord of elastic material.

18. The improvements according to claim 14, further comprising a first switch movable between a first position for placing the ratchet in a first condition for acting on the framework to impart rotation to the one of the rear wheels in a clockwise direction in response to movement of the lever between the first and second positions, and a second position for placing the ratchet in a second condition for acting on the framework to impart rotation to the one of the rear wheels in a counter clockwise direction in response to movement of the lever between the first and second positions.

19. The improvements according to claim 18, further comprising a second switch carried by the lever operatively coupled to the first switch, in which the first switch moves between the first and second positions thereof in response to movement of the second switch.

20. The improvements according to claim 19, wherein the second switch located adjacent to the outer end of the lever.

* * * * *